US007074287B2

(12) United States Patent
Belleguic et al.

(10) Patent No.: US 7,074,287 B2
(45) Date of Patent: Jul. 11, 2006

(54) METHOD OF ASSEMBLING AND MONITORING AN ACOUSTIC PANEL COMPRISING A DOUBLE RESONATOR WITH A HONEYCOMB CORE

(75) Inventors: Yann Belleguic, Tonquedec (FR); Clemence Julia Genevieve Marie Perrot, Le Havre (FR); Jean Fabrice Marcel Portal, Sainte Adresse (FR)

(73) Assignee: Hurel Hispano, Gonfreville L'Orcher (FR)

( * ) Notice: Subject to any disclaimer, the term of this patent is extended or adjusted under 35 U.S.C. 154(b) by 0 days.

(21) Appl. No.: 10/510,206

(22) PCT Filed: Apr. 22, 2003

(86) PCT No.: PCT/FR03/01266

§ 371 (c)(1),
(2), (4) Date: Nov. 15, 2004

(87) PCT Pub. No.: WO03/090202

PCT Pub. Date: Oct. 30, 2003

(65) Prior Publication Data

US 2005/0178489 A1 Aug. 18, 2005

(30) Foreign Application Priority Data

Apr. 22, 2002 (FR) .................................. 02/05000

(51) Int. Cl.
*B32B 41/00* (2006.01)
*B32B 37/12* (2006.01)

(52) U.S. Cl. ........................ 156/64; 156/182; 156/197; 156/292

(58) Field of Classification Search .................. 156/64, 156/292, 182, 197; 181/284–294
See application file for complete search history.

(56) References Cited

U.S. PATENT DOCUMENTS

| | | | | |
|---|---|---|---|---|
| 4,421,811 | A * | 12/1983 | Rose et al. | 428/116 |
| 4,541,879 | A * | 9/1985 | Riel | 156/64 |
| 5,175,401 | A | 12/1992 | Arcas et al. | |
| 6,203,656 | B1 | 3/2001 | Syed | |

FOREIGN PATENT DOCUMENTS

| | | |
|---|---|---|
| EP | 0 509 166 A1 | 10/1992 |
| GB | 2 324 262 A | 10/1998 |

* cited by examiner

*Primary Examiner*—George Koch
(74) *Attorney, Agent, or Firm*—Oliff & Berridge, PLC

(57) ABSTRACT

The invention relates to a method of producing and checking a double-resonator honeycomb acoustic panel. The aforementioned panel is characterised in that, following the assembly of the two honeycombs and the partition and prior to the assembly of at least one of the two liners, the perforation rate of said partition is checked by scanning same with digital camera. The successive images thus obtained are transmitted to a computer which determines the perforation rate T of the partition by applying formula T=N1/N, wherein N1 is the number of pixels that correspond to the holes and N is the number of pixels in the image.

12 Claims, 5 Drawing Sheets

METHOD OF ASSEMBLING AND MONITORING AN ACOUSTIC PANEL COMPRISING A DOUBLE RESONATOR WITH A HONEYCOMB CORE

TECHNICAL FIELD OF THE INVENTION

The invention relates to acoustic panels comprising a double resonator with a honeycomb core and, more specifically, to a method of assembling and monitoring such panels.

PRIOR ART AND PROBLEMS TO BE SOLVED

Acoustic panels comprising a double resonator with a honeycomb core are well-known sandwich structures for absorbing noise, in particular on aircraft power plants. These panels usually include the following successive layers in the direction of the thickness: a first “acoustic” skin which is multiperforated, that is to say including a plurality of holes, a first, “primary” honeycomb layer, a likewise multiperforated septum, a second, “secondary” honeycomb layer, and a second skin referred to as “solid skin” because it does not include any holes. The honeycombs consist of a plurality of generally hexagonal cells, these cells being separated by thin partitions themselves including drainage slots for discharging by gravity the water which might have entered the acoustic panel during its use. The holes in the acoustic skin and in the septum are regularly distributed and are each characterized by their degree of perforation, that is to say by the ratio of the area of the holes to the total area of the layer in question. The acoustic skin and the solid skin are usually made of composite material having an organic matrix and consist of a variable number of reinforcing fabric layers placed one above the other and embedded in a cured resin. The honeycomb layers are usually made of aluminum strip.

The acoustic properties of the panel, that is to say its degree of noise absorption as a function of the frequency and of the sound level of the noise, depend on the dimensioning of the components of the panel and, in particular, on the degrees of perforation of the solid skin and of the septum.

Each layer is manufactured separately and methods of doing so are well known. The acoustic skin is usually pierced with a drill because the size of the holes allows this to be done without difficulty. The septum may be pierced with a drill, but it is preferred for piercing to be carried out with a laser beam because of the small size of the holes and the large number thereof.

The acoustic panel is then assembled by placing the various preglued layers on a mold having the required shape and exposing the assembly to a heat cycle in an autoclave with the aim of clamping the layers against one another and of curing the adhesives. It should be noted that the solid skin may be produced and glued on the panel in a single operation.

The critical phase of the assembly method is the assembly of the septum with the two honeycomb layers by gluing. This is because, during the assembly, a fraction of the holes in the septum is normally blocked by the adhesive and this is taken into account in order to define the degree of perforation of the bare septum, that is to say before its assembly. This fraction easily reaches 50%. Too low or too high a fraction significantly changes the acoustic properties of the panel and makes it unsuitable for the use which was intended. This fraction is minimal when the cells of each of the honeycomb layers are in phase, that is to say correctly face one another, because the adhesives used for assembling each of the honeycombs with the septum substantially block the same holes in the septum. This fraction becomes maximal when the cells of each of the honeycombs are in phase opposition, that is to say have a maximum offset. The geometry of the honeycombs is unfortunately imprecise and the phenomenon which has just been described can consequently only be controlled with difficulty.

This fraction also depends on the quantity of adhesive used, but the actual gluing operation for its part can be effectively controlled.

The holes in the septum are usually very small, i.e. have a diameter of around 0.3 mm with about 50 holes per centimeter squared. Such a septum is pierced before assembly using a drill but preferably with a laser beam. The number and smallness of the holes make the piercing operation difficult. Thus, even though the piercing method is fairly well controlled, defects may arise.

It is known to measure the standard resistance of the bare septum, that is to say before any assembly, with a pressure loss measuring system referred to more simply as a “raylometer”. However, this method has some disadvantages:

- the raylometer is an unstable pneumatic apparatus and it requires frequent recalibrations;
- monitoring the bare septum is a lengthy process because the raylometer has to be successively applied at various locations on the panel and it is necessary to wait until the measurement has stabilized before taking it into account;
- monitoring septums of large size requires special, and therefore expensive, raylometers because they must be able to reach the center of the septums.

The inventors are not aware of any satisfactory means for measuring the characteristics of a finished panel during production. In fact, a measurement performed with the aforementioned raylometer is marred by very considerable errors caused by lateral leaks through the drainage slots in the partitions and also by the inevitable misalignment of the two honeycomb layers.

There is also known another measuring instrument referred to as a “Kundt’s tube” allowing direct measurement of acoustic impedance. Unfortunately, the measurements performed with a Kundt’s tube on the panel described above are likewise marred by very considerable errors arising from the cells of the honeycomb overlapping the edge of the Kundt’s tube when it is applied against the panel.

A first problem to be solved is to propose a method of assembling and monitoring acoustic panels which makes it possible to guarantee the intended acoustic characteristics.

A second problem to be solved is to detect as early as possible any defects likely to adversely affect the characteristics of the panel, in order to be able to interrupt the assembly process and, consequently, not to carry out unnecessary assembly operations.

A third problem is to propose a reliable assembly and monitoring method which is relatively inexpensive.

SUMMARY OF THE INVENTION

The invention proposes a method of assembling and monitoring an acoustic honeycomb panel comprising a double resonator, the panel consisting of a plurality of layers to be assembled in the direction of the thickness of the panel, namely: an acoustic skin, a primary honeycomb, a septum pierced with a plurality of holes, a secondary honeycomb and a solid skin, the method including preliminary operations of gluing the various layers to be assembled.

Such a panel is noteworthy in that:

- in a first step, the two honeycombs are assembled with the septum by gluing in order to constitute a subassembly, this assembly unfortunately having the effect of inevitably obstructing a fraction of the holes in the septum;
- subsequent to the assembly of the two honeycombs with the septum and prior to the assembly of at least one of the two skins, at least one of the honeycombs thus being uncovered, the degree of perforation of the septum is monitored by scanning the subassembly with a digital camera including an associated illumination system, the camera being arranged on the same side as an uncovered honeycomb, the camera thus taking shots of the septum at the bottom of the cells of the uncovered honeycomb, this illumination system illuminating the region of the septum observed by the camera, the successive images thus obtained being transmitted to a computer, the computer analyzing the images and establishing the degree of perforation T of the septum by applying the formula $T=N1/N$, in which N1 is the number of pixels corresponding to the free holes and N is the number of pixels of the image.

It will be understood that the invention makes it possible to monitor the proper execution of the critical phase of the assembly method, namely the assembly of the septum with the two honeycombs. Thus, because the other assembly operations are able to be effectively controlled, implementing the invention makes it possible to guarantee that acoustic panels are obtained with performance levels as close as possible to those which they were designed to have, providing a solution to the first problem.

It will also be understood that the invention makes it possible to monitor as early as possible the proper execution of the critical phase of the assembly method since this monitoring can be carried out immediately after this critical phase, thereby solving the second problem. When monitoring shows the septum to be defective, the unnecessary operations of assembling the skins may therefore be avoided.

It will also be understood that the assembly and monitoring method is relatively inexpensive because it may be interrupted when the critical phase has not proceeded properly and because the monitoring means are themselves relatively inexpensive.

It will finally be understood that the present invention has required the selection and design of specific monitoring means, since the raylometer and the Kundt's tube do not provide sufficient precision, unlike the image acquisition and analysis method proposed.

Advantageously, and prior to the assembly of the septum with at least one of the honeycombs, the degree of perforation T of the bare septum is monitored by scanning the septum with a digital camera including an associated illumination system, this illumination system illuminating the region of the septum observed by the camera, the successive images thus obtained being transmitted to a computer, this computer analyzing the images and establishing the degree of perforation T of the septum by applying the formula $T=N1/N$, in which N1 is the number of pixels corresponding to the free holes and N is the number of pixels of the image.

This inexpensive monitoring operation makes it possible not to initiate assembly of acoustic panels starting from defective septums.

The invention will be better understood and the advantages provided thereby will become more clearly apparent in the light of a detailed exemplary embodiment of the method and in the light of the appended figures.

DESCRIPTION OF A DETAILED EXEMPLARY EMBODIMENT

Figure 1:
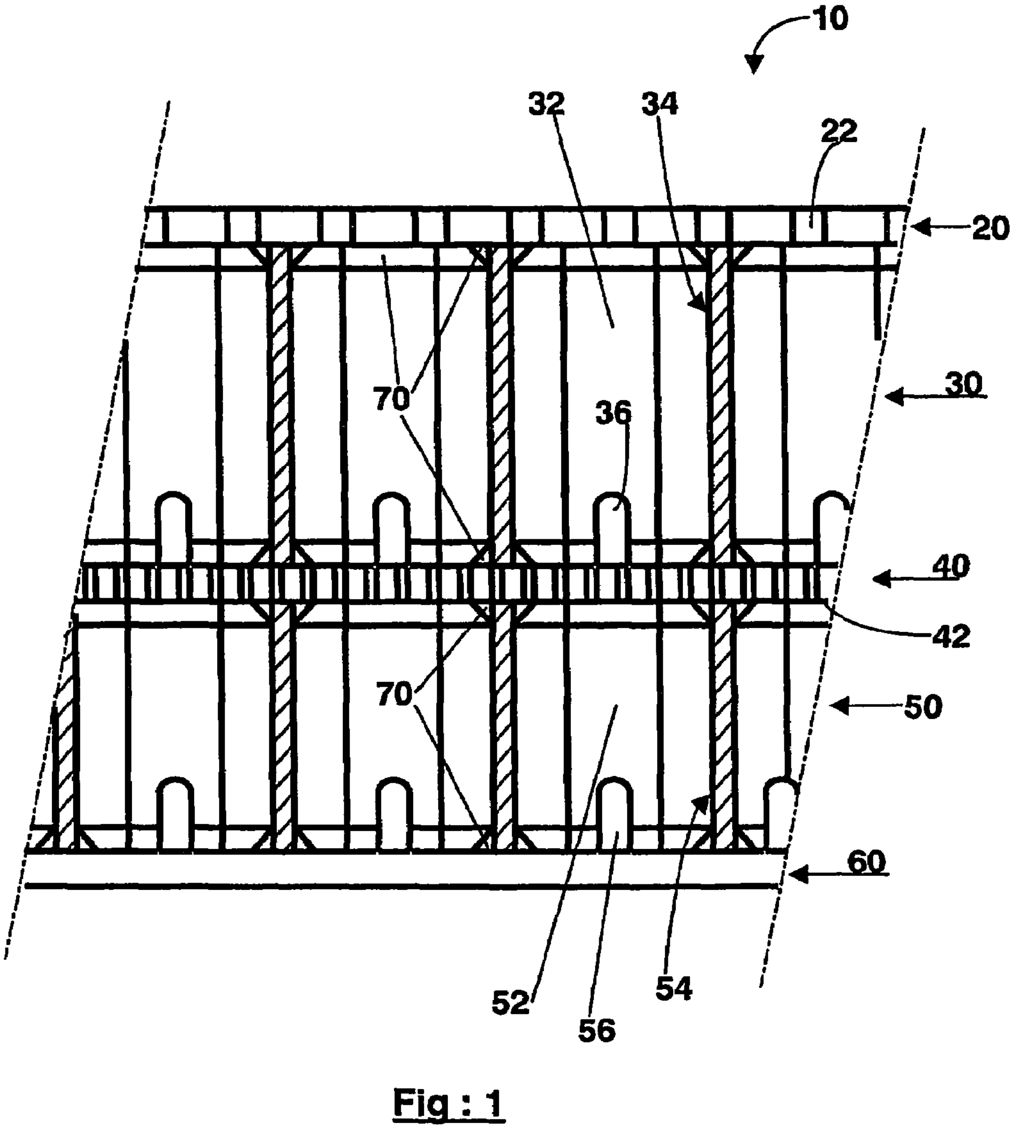
FIG. 1 illustrates an acoustic panel to which the invention can be applied.

Reference will be made first of all to FIG. 1. The acoustic panel 10 is a laminated structure consisting of the assembly of various layers in the direction of the thickness, namely successively: an acoustic skin 20, a "primary" honeycomb 30, a septum 40, a "secondary" honeycomb 50, and finally a solid skin 60.

The acoustic skin 20 is usually made of composite material with an organic matrix consisting of five to fifteen layers of reinforcing fabric (not shown), these fabrics being embedded in a polymerization-cured resin, these fabrics usually consisting of glass, carbon or Kevlar fibers. The acoustic skin 20 is pierced with holes 22 in a regular mesh pattern, their diameter being around 1 mm to 3 mm, the degree of perforation, that is to say the ratio of the total area of the holes 22 to the area of the acoustic skin 20, being around 15 to 25%.

The primary honeycomb 30 consists of adjacent cells 32 oriented in the direction of the thickness of the honeycomb 30, these cells 32 being separated by thin partitions 34, these partitions 34 including drainage slots 36 adjacent to the septum 40, these drainage slots 36 allowing the water that might possibly have entered the panel 10 through the holes 22 in the acoustic skin 20 to flow and be discharged. The cells 32 are most often hexagonal with an inscribed diameter, or width, usually between 3 mm and 10 mm, i.e. ⅛ to ⅜ inch. The partitions 34 may be made of aluminum strip.

The septum 40 is usually made of composite material with an organic matrix consisting of one to five folds of reinforcing fabric (not shown), these fabrics being embedded in a polymerization-cured resin, these fabrics usually consisting of glass, carbon or Kevlar fibers. The septum 40 is also pierced with holes 42 in a regular mesh pattern.

The secondary honeycomb 50 is similar to the primary honeycomb 30. However, its thickness or the width of its cells may be different. The reference numbers 52, 54 and 56 will be used respectively for its cells, its partitions and its drainage slots which are adjacent to the solid skin 60.

The solid skin 60 is similar to the acoustic skin 20, the solid skin 60 not being perforated, however, it being possible for the number and composition of the fabric folds and also the composition of the resin to be different.

The reference number 70 will be used for the adhesive allowing the various layers of the panel 10 to be joined together.

Figure 2:
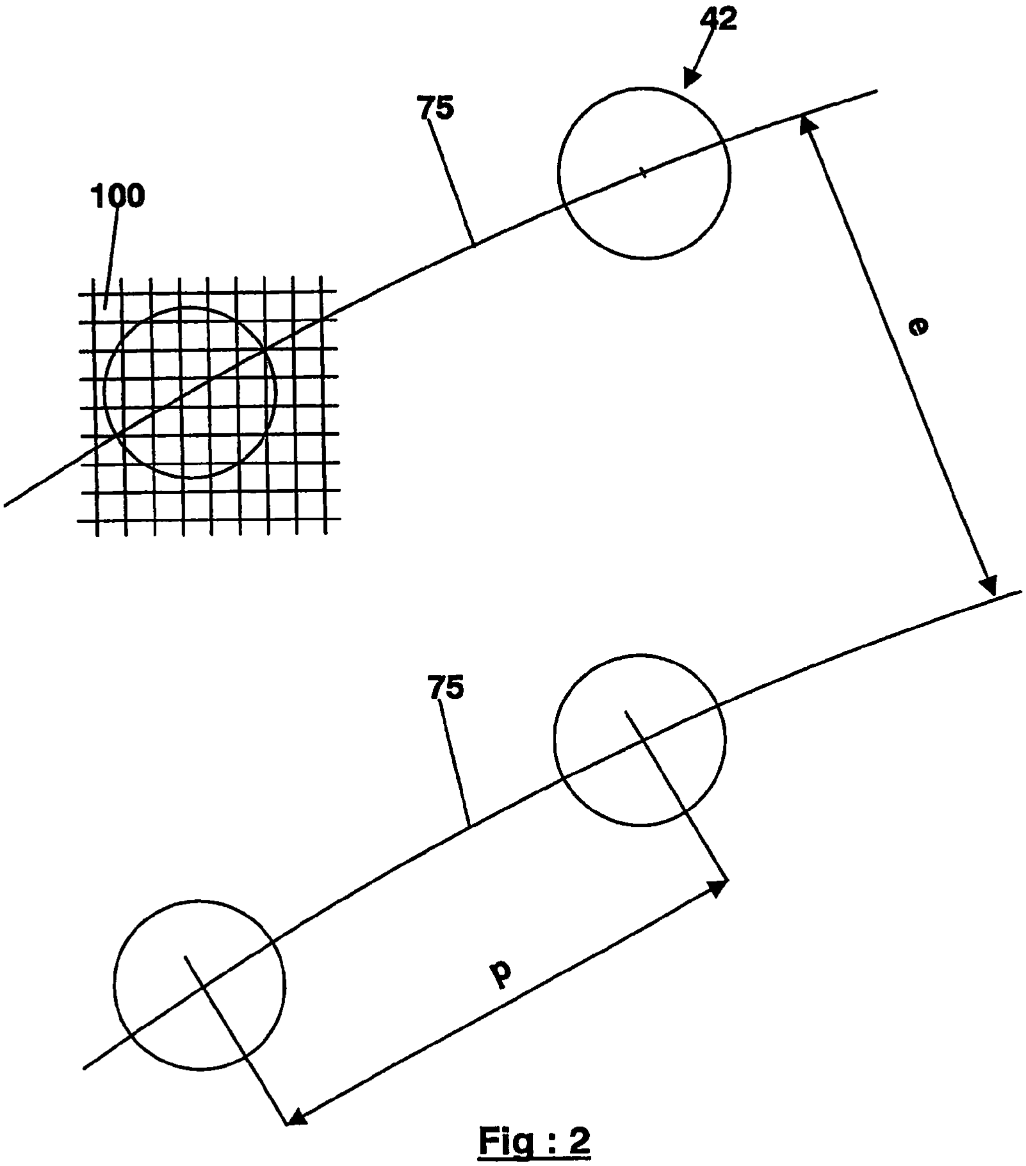
FIG. 2 illustrates a bare septum.

Reference will now be made to FIG. 2. In this example corresponding to the most general form, the holes 42 in the septum are arranged along straight or slightly curved parallel lines 75, the distance between two successive lines being denoted by e, the pitch between two holes 42 on each line 75 being denoted by p. The degree of perforation T is then given by the formula:

$$T=s/e \times p.$$

The holes are pierced using a laser, the septum being arranged on a table having the same shape as it, the piercing apparatus being arranged at the end of a robot arm and passing over the septum by following the piercing lines 75.

Figure 3:
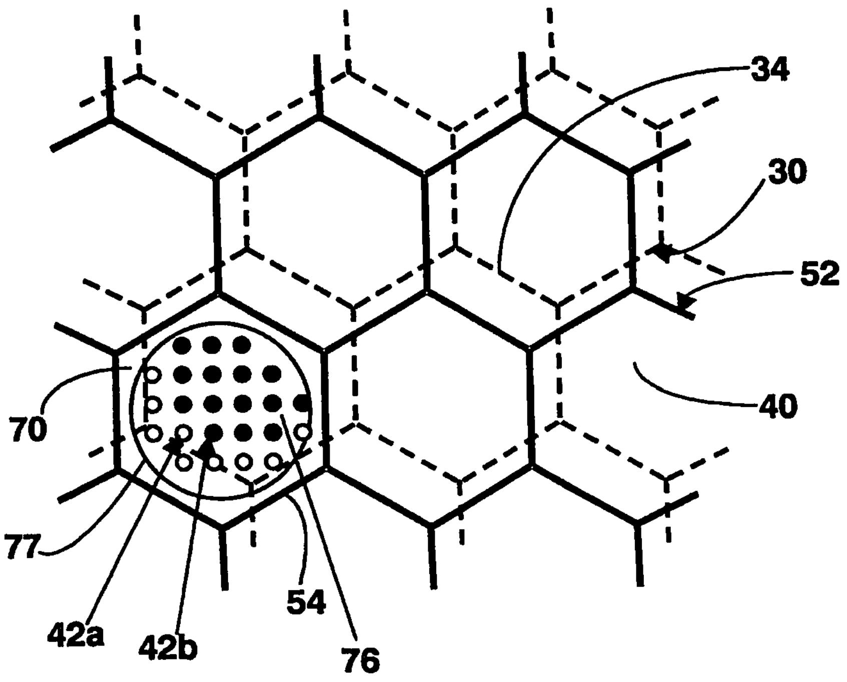
FIG. 3 illustrates an assembled septum.

Reference will now be made to FIG. 3. In this figure, the septum 40 is seen through the cells of one of the honeycombs 30, 50, for example through the cells of the secondary honeycomb 50. The primary honeycomb 30 is consequently not visible and its partitions 34 are represented in a broken line. The adhesive 70 is against the partitions 54 and extends slightly over the septum as far as a gluing limit 77, this gluing limit 77 consequently forming an approximately circular closed line. The holes 42 in the septum 40 appear inside the gluing limit 77, certain holes **42*a* being obstructed by the adhesive holding the primary honeycomb 30 on the septum 40, these blocked holes 42*a* being in the vicinity of the partitions 34 of the primary honeycomb 30. The reference number 42*b*** will be used for the free holes.

Reference will again be made to FIG. 1.

Moreover, the various layers 20, 30, 40, 50 and 60 are obtained, this involving holes 22 being pierced in the acoustic skin 20 and also holes 42 being pierced in the septum 40 and the pregluing of the layers. In a specific embodiment without a bearing on the present invention, the solid skin 60 may be produced and glued on the secondary honeycomb in a single operation and therefore with a single heat cycle.

Figure 4:
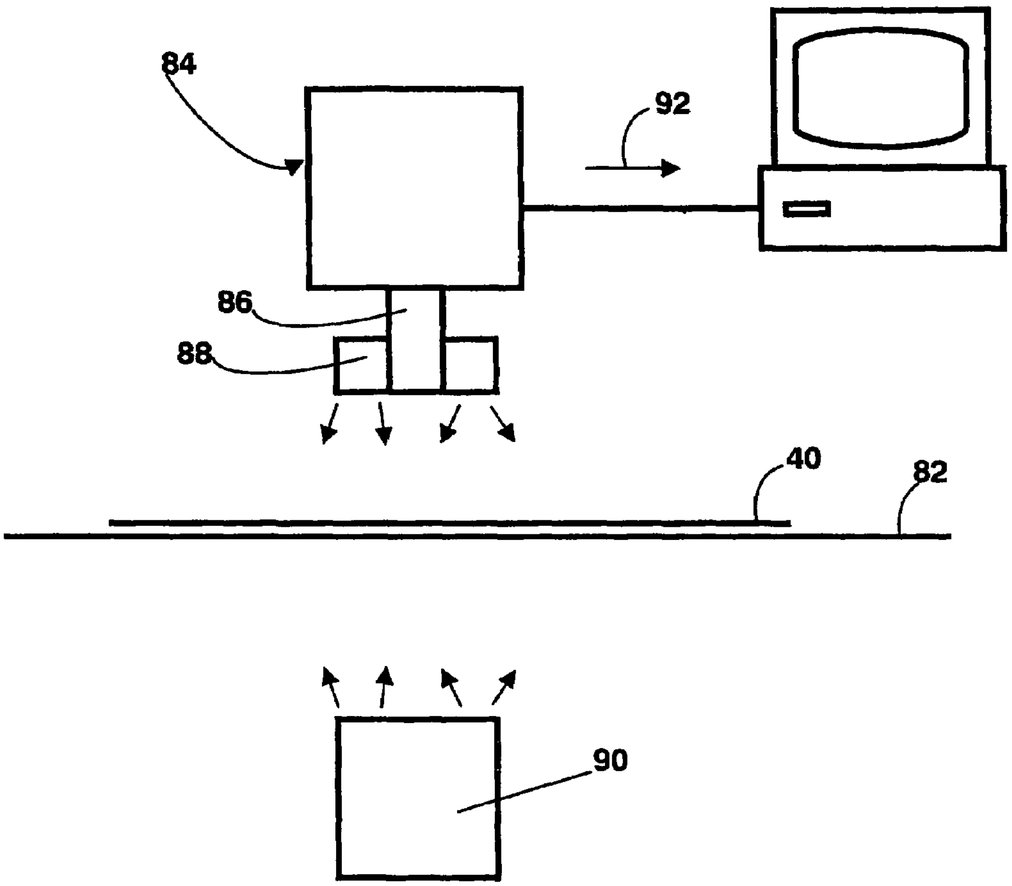
FIG. 4 illustrates the monitoring of a bare septum.

Reference will now be made simultaneously to FIGS. 2 and 4.

Assembly of the panel is advantageously, but not mandatorily, preceded by monitoring the degree of perforation of the septum 40. This monitoring may be exhaustive but it will preferably be carried out by sampling to reduce the cost thereof. The monitoring may be carried out in the following way:

scan the bare septum 40 with a digital camera 84 comprising a lens 86 and an associated illumination system 88, 96, this illumination system 88, 96 clearly illuminating the region of the septum observed by the camera 84, the septum 40 being in practice arranged on a support 82, the successive images 92 thus obtained being transmitted to a computer 94, the computer establishing the degree of perforation T by applying the formula T=N1/N, in which N1 is the number of pixels 100 corresponding to the holes 42 and N is the number of pixels of the image 92. The resolution of the camera and the enlargement ratio of the image 92 are selected so that each hole 42 covers at least 30 pixels on the image. In a preferred embodiment, this resolution is selected so that each hole 42 covers from 75 to 100 pixels on the image, the precision of the measurement consequently being improved by reducing the influence of the pixels overlapping the edges of the holes.

In the case where an episcopic illumination system 88 is used, the pixels 100 corresponding to the holes 42 are those whose light level is below a pre-established threshold level. In the case where a diascopic illumination system 90 is used, the pixels 100 corresponding to the holes 42 are those whose light level is above a pre-established threshold level. This threshold level is established by experimentation in order to give the most accurate measurement, that is to say so that statistically half the pixels overlapping the edge of the hole has a level below this threshold and so that the other half has a level above this threshold.

In the light of these results, the operator will reject the defective septums 40, that is to say those in which the degree of perforations is outside tolerance limits, and will possibly make adjustments to the setting of the machine which has carried out the piercing of the septum 40.

Reference will again be made to FIG. 1.

The assembly includes preliminary operations of pregluing various layers 20, 30, 40, 50 and 60 to be assembled, this pregluing being carried out preferably, but not mandatorily, in the following way:

- the acoustic skin 20 is preglued on its side which will be in contact with the primary honeycomb 30;
- the primary honeycomb 30 is preglued at the ends of the partitions 34 which will be in contact with the septum 40;
- the septum 40 is not exposed to any pregluing which could block the holes 42 thereof, because these holes are too small;
- the secondary honeycomb 50 is also preglued at the ends of the partitions 54 which will be in contact with the septum 40;
- the solid skin 60 is preglued on the side which will be in contact with the secondary honeycomb 50.

After their pregluing, the two honeycomb layers 30, 50, and possibly one of the two skins 20, 60, are then assembled using well known methods, the subassembly thus obtained being referenced 12. The surface of at least one honeycomb 30, 50 remains uncovered and makes it possible to see the septum 40 at the bottom of the cells.

Figure 5:
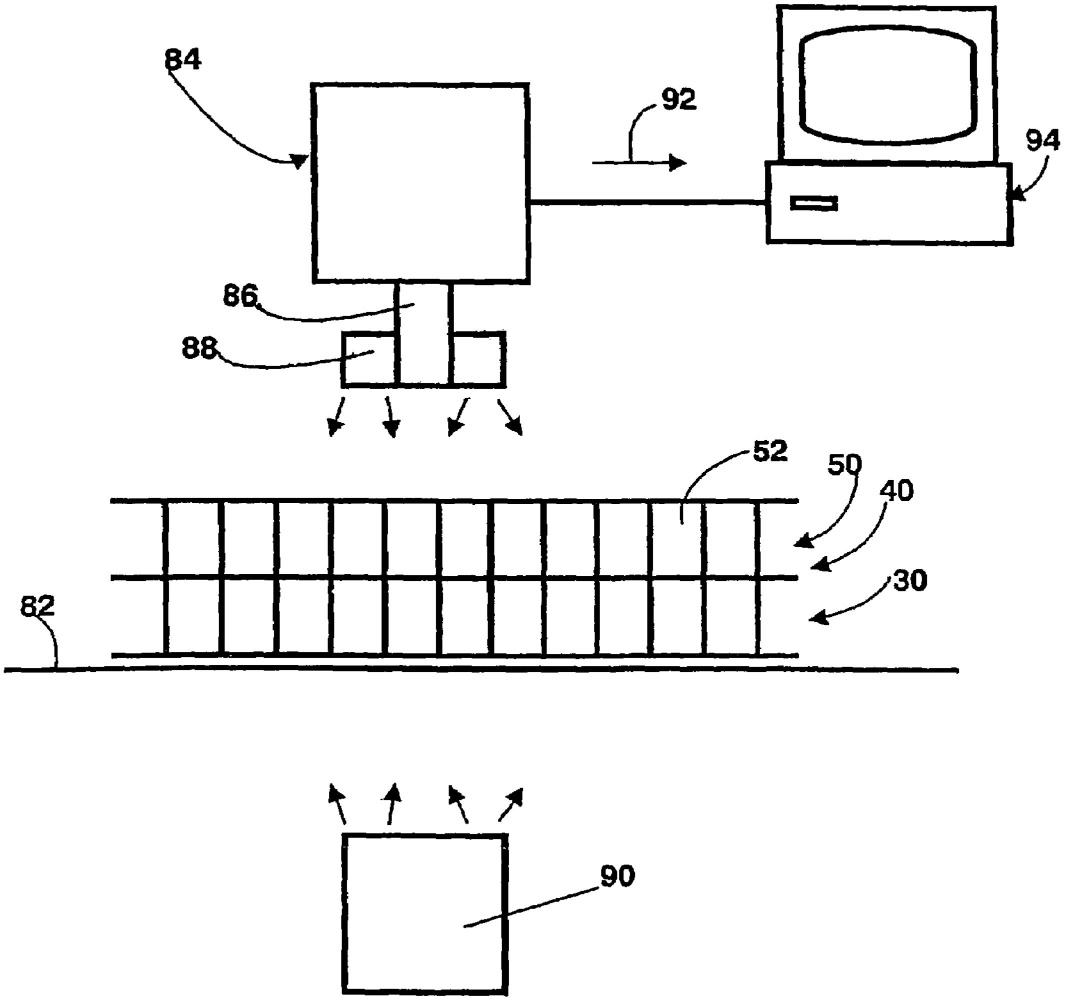
FIG. 5 illustrates the monitoring of a an assembled septum.

Reference will now be made to FIG. 5. The subassembly 12 is monitored, exhaustively or by scanning, in the following way:

scan the subassembly 12 with a digital camera 84 including a lens 86 and an associated illumination system 88, 96, the camera 84 thus taking shots of the septum 40 at the bottom of the cells of the honeycomb 30, 50 between the septum 40 and the lens 86, this illumination system 88, 96 clearly illuminating the region of the septum observed by the camera 84 at the bottom of the cells of the honeycomb 30, 50, the subassembly 12 being in practice arranged on a support 82, the successive images 92 thus obtained being transmitted to a computer 94, the computer establishing the degree of perforation T by applying the formula T=N1/N, in which N1, is the number of pixels (not shown) corresponding to the free holes **42*b* and N is the number of pixels of the image 92. The resolution of the camera and the enlargement ratio are selected so that each hole 42 covers at least 30 pixels on the image 92. In a preferred embodiment, this resolution is selected so that each hole 42** covers from 80 to 100 pixels on the image, the precision of the measurement consequently being improved by reducing the influence of the pixels overlapping the edges of the holes.

In the case where an episcopic illumination system 88 is used, the pixels corresponding to the holes 42 are those in which the light level is below a pre-established threshold level, the adhesive 70 happens to appear on the image with a light level which is also below this threshold. In this case, the computer 94 delimits inside each cell the area 76 of the septum 40 not covered by the adhesive 70, the computer 94 then searching the pixels corresponding to the free holes **42*b* solely within the areas 76 thus delimited. This delimination employs a well-known image analysis function allowing definition of an approximately circular closed line 77 having a size above a given minimum, this closed line 77 then being a boundary between a first region in which the light level is below a predefined threshold and a second region in which the light level is above this same level, this closed line 77 corresponding to the limit of the propagation of the adhesive 70 over the septum 40**.

In the case where neither of the two skins 20, 60 has yet been assembled, it is possible to use a diascopic illumination system 90, the monitoring method then being identical to the above-described method of monitoring the bare septum.

The diascopic monitoring procedure allows simpler image recognition because the free holes 42*b* appear very luminous and with an excellent contrast against a dark background. By contrast, it is more difficult to employ with large panels because the diascopic illumination system 90 which is situated behind the panel with respect to the camera 84 has to follow the movements of this camera 84.

In the case where an episcopic illumination system 88 is used, the pixels 100 corresponding to the holes 42 are those in which the light level is below a pre-established threshold level. In the case where a diascopic illumination system 90 is used, the pixels 100 corresponding to the holes 42 are those in which the light level is above a pre-established threshold level. This threshold level is established by experimentation to give the most accurate measurement, that is to say so that statistically half the pixels overlapping the edge of the hole has a level below this threshold and so that the other half has a level above this threshold.

The resolution of the camera and the enlargement ratio of the image 92 are also selected so that each hole 42 covers at least 30 pixels on the image. In a preferred embodiment, this resolution is selected so that each hole 42 covers from 75 to 100 pixels on the image, the precision of the measurement consequently being improved by reducing the influence of the pixels overlapping the edges of the holes. The enlargement ratio of the camera 84 must not be too high, however, in order that this camera 84 has a sufficient field for each image 92 to completely cover at least one cell. In practice, this enlargement ratio is around 3 to 6.

Also in practice, the degree of perforation of the assembled septum must be equal to a mean value plus or minus 12%. In the event that the degree of perforation after assembly departs from these limits, the assembled septum 40 consequently being defective, the process of assembling the panel 10 is interrupted.

In a specific embodiment of the invention, the solid skin 60 is produced and glued on the secondary honeycomb 50. This arrangement has the advantage of requiring the solid skin 60 to be subjected to a single heat cycle ensuring simultaneous curing of the resin of the matrix and the adhesive.

It will be understood that the present invention may be implemented with various sequences for assembling the acoustic panel, the important thing being that:

1. the septum is monitored subsequent to its assembly with the two honeycombs which are adjacent to it,
2. the septum to be monitored is visible from the outside through the cells of at least one honeycomb. In the case where the illumination system is episcopic, it is sufficient for the septum to be visible through one of the honeycombs and it is therefore possible for the monitoring to be performed after one of the skins has been assembled. In the case where the illumination system is diascopic, the septum must be visible through the cells of each of the honeycombs and it is thus necessary for the septum to be monitored before any assembly of the skins.

Also known are "triple resonator" acoustic panels including successively in the direction of the thickness: an acoustic skin, a first honeycomb, a first septum, a second honeycomb, a second septum, a third honeycomb and a solid skin. The present invention can be applied:

- to the monitoring of a first septum assembled with the two honeycombs which are adjacent to it, the illumination system being episcopic or diascopic,
- to the monitoring of the second septum after its assembly so as to constitute a subassembly including the two septums and the three honeycombs, the monitoring then being carried out with an episcopic illumination system,
- to the monitoring of the two septums after their assembly with the three honeycombs, the monitoring then being carried out with an episcopic illumination system, it being possible for the assembly to be carried out in a single heat cycle in an autoclave, with the three honeycombs.

The invention claimed is:

1. A method of assembling and monitoring an acoustic honeycomb panel comprising a double resonator, the panel consisting of a plurality of layers to be assembled in the direction of the thickness of the panel namely: an acoustic skins, a primary honeycombs, a septum pierced with a plurality of holes, a secondary honeycomb and a solid skin, the method including preliminary operations of gluing the various layers to be assembled, characterized in that:

- in a first step, the two honeycombs are assembled with the septum by gluing, the subassembly thus obtained being referenced, the holes in the septum which are still free being referenced;
- subsequent to the assembly of the two honeycombs with the septum and prior to the assembly of at least one of the two skins, at least one of the honeycombs thus being uncovered, the degree of perforation of the septum is monitored by scanning the subassembly with a digital camera including an associated illumination system, the camera being arranged on the same side as an uncovered honeycomb, the cameras thus taking shots of the septum at the bottom of the cells of the uncovered honeycomb, this illumination system illuminating the region of the septum observed by the camera, the successive images thus obtained being transmitted to a computer, the computer analyzing the images and establishing the degree of perforation T of the septum by applying the formula T=N1/N, in which N1 is the number of pixels corresponding to the free holes and N is the number of pixels of the image.

2. The method as claimed in claim 1, characterized in that the septum is monitored prior to the assembly of the two skins and in that the illumination system is a diascopic illumination system.

3. The method as claimed in claim 1, characterized in that the illumination system is an episcopic illumination system.

4. The method as claimed in claim 3, characterized in that on the images the computer delimits, inside each cell, the area of the septum not covered by the adhesive, this computer searching the pixels corresponding to the free holes solely within these areas.

5. The method as claimed in claim 1 4, characterized in that the resolution of the camera and the enlargement ratio of the images is suitable for each hole in the septum to cover at least 30 pixels.

6. The method as claimed in claim 1, characterized in that the resolution of the camera and the enlargement ratio of the images is suitable for each hole in the septum to cover at least 75 pixels.

7. The method as claimed in claim 1, characterized in that it is interrupted when the monitoring operation on the assembled septum shows that it is defective.

8. The method as claimed in claim 1, characterized in that the solid skin is produced and glued on the secondary honeycomb in a single operation.

9. The method as claimed in claim 1, characterized in that, prior to the assembly of the septum with at least one of the honeycombs, the degree of perforation T of the bare septum is monitored by scanning the septum with a digital camera including an associated illumination system, this illumination system illuminating the region of the septum observed by the camera, the successive images thus obtained being transmitted to a computer, the computer establishing the degree of perforation T by applying the formula T=N1/N, in which N1 is the number of pixels corresponding to the holes 42 and N is the number of pixels of the image.

10. The method as claimed in claim 9, characterized in that the assembly of the panel is interrupted when the monitoring operation on the bare septum shows that this septum is defective.

11. The method as claimed in claim 9, characterized in that the resolution of the camera and the enlargement ratio of the images is suitable for each hole in the septum to cover at least 30 pixels.

12. The method as claimed in claim 9, characterized in that the resolution of the camera and the enlargement ratio of the images is suitable for each hole in the septum to cover at least 75 pixels.

* * * * *